(No Model.)
J. T. DAWES.
ADVERTISING APPLIANCE.
No. 556,137. Patented Mar. 10, 1896.
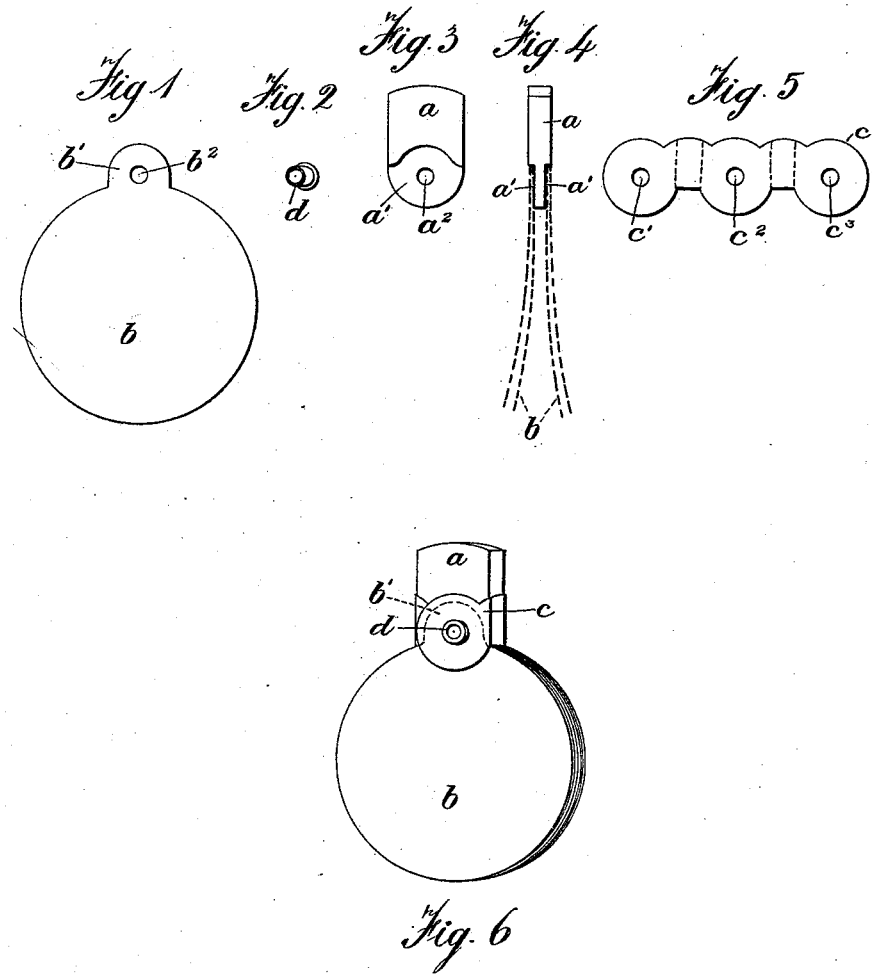
Witnesses
James Johnson
Jno. Procott
Inventor
John Thomas Dawes

UNITED STATES PATENT OFFICE.

JOHN THOMAS DAWES, OF CEFU MAWR, ENGLAND.

ADVERTISING APPLIANCE.

SPECIFICATION forming part of Letters Patent No. 556,137, dated March 10, 1896.

Application filed November 6, 1895. Serial No. 568,107. (No model.)

*To all whom it may concern:*

Be it known that I, JOHN THOMAS DAWES, a subject of the Queen of Great Britain, residing at Cefu Mawr, in the county of Flint, England, have invented a new and useful Improvement in Advertising Appliances, of which the following is a specification.

The object is to provide a new and improved appliance for facilitating advertising, such appliance being also useful for erasing pencil and ink marks and for wiping pens.

Figure 1 is a plan of the cover and leaves of my improved appliance on which the advertising is effected. Fig. 2 is a perspective view of the eyelet for securing the various parts together. Fig. 3 is an elevation of the eraser. Fig. 4 is a side elevation showing the eraser and leaves in position. Fig. 5 is a plan of the clip for uniting the various parts, and Fig. 6 is a perspective view of the complete appliance.

$a$ is the eraser, recessed on both sides at $a'$ to receive the leaves $b$.

$a^2$ is a perforation through the eraser through which the eyelet passes.

$b$ designates the cover and leaves on which the advertisements are printed or impressed.

$b'$ is a projection on the cover or leaves to fit the recesses $a'$.

$b^2$ is the perforation through which the eyelet passes.

$c$ is the clip shaped to fit round the eraser $a$ within the recesses $a'$ and over the projections $b'$. $c'$ $c^2$ $c^3$ are perforations in the clip through which the eyelet passes. The apertures $c'$ and $c^3$ overlap when the clip $c$ is in position. $d$ is the eyelet. The leaves are made of any suitable substance, such as paper or textile material, and the covers of any suitable substance, such as leather.

I claim—

1. The combination of the eraser $a$ and advertising leaves and covers $b$ secured together substantially as and for the purpose set forth.

2. The eraser $a$, recessed on both sides at $a'$ with aperture $a^2$, the advertising leaves and covers $b$ with projection $b'$ and apertures $b^2$, the clip $c$ with apertures $c'$ $c^2$ $c^3$ and the eyelet $d$ combined substantially as and for the purpose set forth.

In testimony whereof I have hereunto set my hand this 22d day of October, 1895.

JOHN THOMAS DAWES.

Witnesses:
 JAMES JOHNSON,
 JNO. GROCOTT.